UNITED STATES PATENT OFFICE.

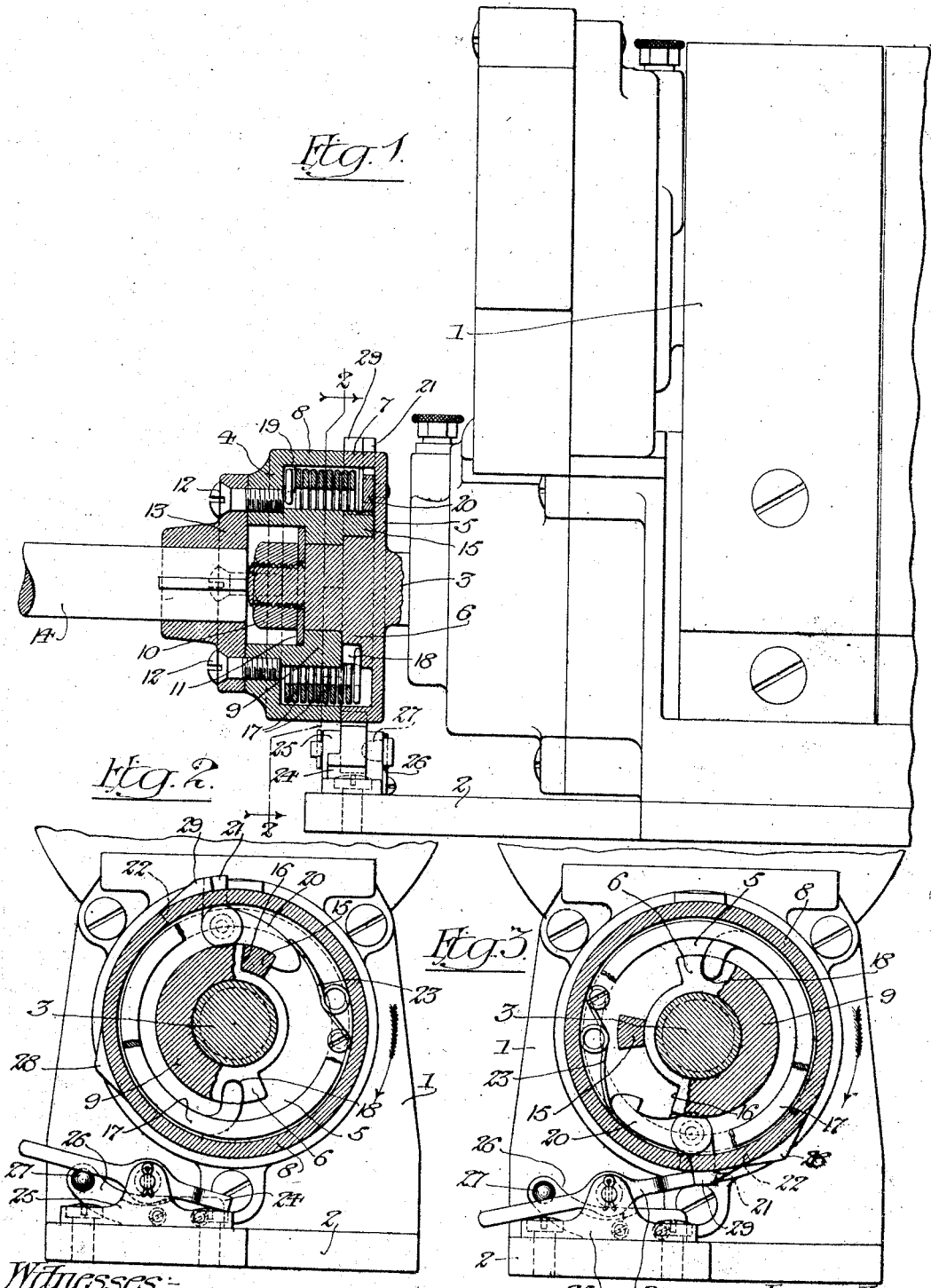

FREDERICK H. HORNING, OF CHICAGO, ILLINOIS, ASSIGNOR TO THE SWISS MAGNETO COMPANY, OF CHICAGO, ILLINOIS, A CORPORATION OF NEW YORK.

STARTING-COUPLING FOR HIGH-TENSION MAGNETOS.

1,308,076.     Specification of Letters Patent.     Patented July 1, 1919.

Application filed January 30, 1915. Serial No. 5,242.

*To all whom it may concern:*

Be it known that I, FREDERICK H. HORNING, a citizen of the United States, and a resident of Chicago, county of Cook, and State of Illinois, have invented certain new and useful Improvements in Starting-Couplings for High-Tension Magnetos, of which the following is a full, clear, and exact description.

The invention relates to high tension magnetos for explosive engines and seeks to provide an improved coupling for accelerating the movement of the magneto armature and thereby producing an effective spark for starting the engine. The invention consists in the features of improvement hereinafter set forth, illustrated in the preferred form in the accompanying drawings and more particularly pointed out in the appended claims.

In the drawings, Figure 1 is a view in elevation of the magneto with the improved coupling shown in section. Fig. 2 is a cross section on the line 2—2 of Fig. 1. Fig. 3 is a similar view, showing the parts in shifted position.

In the construction shown, the magneto 1, which may be of any suitable construction, is mounted upon a base plate 2. The improved coupling, through which the armature shaft 3 is driven, comprises driving and driven members which are preferably in the form of disks 4 and 5. The driven member or disk 5 is connected to rotate with the armature shaft and is preferably fixed thereto or formed in piece therewith as shown. In the preferred form shown the driven disk is provided with a central hub portion 6 and a peripheral flange 7.

The driving disk 4 is also preferably provided with a peripheral flange 8 and with a central hub portion 9 which is rotatably mounted upon the armature shaft and abuts, as shown, against the hub portion 6 of the driven disk 5. The driving disk or member is held in place by a nut 10 and washer 11 which are mounted upon the reduced, threaded, outer end of the armature shaft and which, in the particular construction shown, are arranged within a central recess in the outer face of the driving disk or member 4. The driving disk or member 4 is connected to the shaft of the explosive engine in any suitable manner. In the construction shown it is connected by screws 12 to a flanged coupling member 13 on the end of a countershaft 14, which is arranged in line with the armature shaft 3.

The hub 9 of the driving member is provided at its inner end with a projecting lug 15 which extends within a cut-away space or recess in the hub 6 of the driven disk or member 5. This lug coöperates with a shoulder or stop 16 at one end of the recess in the hub 6 of the driven member to thereby limit the relative rotary movement of the driving and driven members. A spring 17 is coiled about the hub portions 6 and 9 and is inclosed within the disk flanges 7 and 8. The inner hook end of the spring engages a recess 18 in the driven disk hub 6, as shown in Figs. 2 and 3, while the outer hook end of the spring engages a lug 19 (see Fig. 1) on the driving disk.

By placing the spring 17 under tension and then releasing it, a quick accelerated movement can be imparted to the armature shaft 3 to thereby produce an effective spark in starting the engine. But this spring does not form the usual driving connection between the coupling members. Instead the coupling members are normally locked against relative rotation so that the armature shaft is positively driven in the direction indicated by the arrows in Figs. 2 and 3. For this purpose a locking dog is provided for normally connecting the driving and driven members of the coupling. But, in starting the engine, a suitable trip is employed to release the locking dog to thereby permit the relative rotation of the coupling members whereby the spring 17 is placed under tension and the accelerated movement of the armature shaft effected.

In the preferred construction shown, a hook-like locking dog 20 is pivotally mounted on the inner face of the disk 5 adjacent the shoulder or stop 16 thereof, and this dog is arranged to hook over the projecting lug 15 of the driving disk and normally hold the latter in engagement with the stop shoulder 16, as shown in Fig. 2. The locking dog is provided with a tail 21 which projects radially through a slot 22 in the flange 7 of the disk 5. A spring 23 fixed to the inner face of the disk 5 engages the dog 20 and holds it in normal locking position in engagement with the lug 15 and with the tail 21 at the forward end of the slot 22. The coupling members are thus ordinarily locked together against relative rotation and positively rotate the armature shaft 3.

A shiftable trip 24 for releasing the locking dog is preferably mounted upon a stationary part and for this purpose is pivoted between its ends upon a bracket 25 that is fixed to an extension of the base plate 2. This trip can be shifted from an idle, inoperative position shown in Fig. 2 to an operative position shown in Fig. 3, in which the inner working end of the dog engages the adjacent portions of the flanges 7 and 8 of the coupling members. A leaf spring 26 fixed to one side of the bracket 25 is provided with a detent 27 which is arranged to engage the tail of the trip 24 and hold the latter in operative position.

In its operative position, the inner end of the trip 24 is in the path of movement of the tail 21 of the locking dog 20 and is also in the path of movement of a projecting cam lug 28 that is formed upon the flange 8 of the driving disk or member. Preferably also the flange 7 of the driven disk or member is provided with a projecting lug 29 which is arranged to coöperate with the trip 24.

When the engine is running, the members or disks of the coupling are, as stated, locked together by the dog 20, and the armature shaft is positively driven. Under such conditions, as shown in Fig. 2 the tail 21 of the locking dog is located slightly in advance of the lug 29 on the driven member or disk and is considerably in advance of the cam lug 28 on the driving member. In starting the engine, the trip 24 is shifted by any suitable means from the position shown in Fig. 2 to that shown in Fig. 3 and it is yieldingly held in the latter, operative position by the spring-held detent. The engine shaft is then slowly rotated either by hand or by a suitable starting motor. This of course rotates the magneto coupling and the armature shaft 3 until the inner end of the trip 24 encounters the tail 21 of the locking dog and the lug 29 of the driven coupling member. The dog is then shifted against the tension of the spring 23 to its released position as shown in Fig. 3 and the movement of the driven coupling member and of the armature shaft 3 is arrested. The continued forward movement of the driving coupling member 4 will place the spring 17 under tension and this forward, relative movement of the driving coupling member will continue until the cam lug 28 thereon strikes the trip 24 and shifts it to its inoperative position. The driven member and the armature shaft are then released and are moved quickly forward by the spring 17 to produce a strong spark in the engine cylinder. At the end of this relative forward movement of the driven coupling member, the inclined or cam shaped forward end of the locking dog 20 engages and rides over the lug 15 and the hook of the locking dog snaps into place to again hold the lug against the shoulder 16. The coupling members are then again locked together and rotate in unison in forward direction. If one spark is insufficient to start the engine, the trip 24 can again be shifted to operative position to produce another accelerated movement of the armature shaft as above described.

With the improved coupling, when the engine is running, there is no lost motion between the armature shaft and the engine shaft on account of the spring that is interposed between the coupling members, but, in starting the engine, the spring can be employed for effecting an accelerated movement of the armature shaft.

It is obvious that numerous changes may be made in the details set forth without departure from the essentials of the invention as defined in the claims.

I claim as my invention:

1. A starting coupling for igniter magnetos comprising co-axial, relatively rotatable driving and driven members, a shiftable, spring held locking dog normally connecting said members to positively hold the same against relative rotation, an actuating spring interposed between said members, a trip mounted on the stationary part and arranged to successively engage and release said locking dog and arrest said driven member to thereby place said spring under tension and means for automatically shifting said trip to thereby release said driven member.

2. A starting coupling for igniter magnetos comprising co-axial relatively rotatable driving and driven members, a locking dog shiftably mounted on said driven member and normally engaging said driving member to thereby positively hold the same against relative rotation, an actuating spring interposed between said members, a trip mounted on a stationary part arranged to engage and release said locking dog and to engage and arrest said driven member and means on said driving member for shifting said trip to inoperative position.

3. A starting coupling for igniter magnetos comprising coaxial, relatively rotatable driving and driven members, a spring held locking dog pivotally mounted on said driven member to move to and from the axis thereof, said dog normally engaging said driving member to thereby positively hold said members against relative rotation, an actuating spring interposed between said members, a trip arranged to engage and release said locking dog and arrest said driven member, and a cam on said driving member for shifting said trip to inoperative position.

4. A starting coupling for igniter magnetos comprising coaxial, relatively rotatable driving and driven disks for overlapping the hub portions, a torsion spring coiled about its hub portions and having offset ends engaging seats in said disks, the latter having flanges for inclosing said spring, said driven disk having a projecting stop device, a shiftable, spring held locking dog mounted on said driven disk and arranged to engage said driving disk to normally hold said disks against relative rotation, said dog having a part projecting adjacent said stop device, a shiftable trip arranged to successively engage the projecting part of said dog and said stop device, and a cam lug on said driving disk for shifting said trip to inoperative position.

5. In a starting coupling for igniter magnetos, the combination of co-axial, relatively movable, driving and driven disks having hub portions provided with a coöperating lug and stop, a spring coiled about said hub portions and connected at its ends to said members, said disks having flanges inclosing said spring, said driven disk having a projecting stop device, a shiftable trip arranged to engage said stop device and arrest said driven disk, a cam lug on the flange of said driving disk for shifting said trip to inoperative position, and a spring device for yieldingly holding said trip in operative position.

6. A starting coupling for igniter magnetos comprising relatively movable driving and driven disks having hub portions, a projecting lug on the hub of said driving disk, a coöperating stop on the hub of said driven disk, a spring coiled about said hub portions and connected at its ends to said disks, a spring-pressed locking dog on said driven disk normally engaging said lug and holding the same in engagement with said stop, a trip for engaging and releasing said dog and arresting said driven member, and a cam lug on said driving member for shifting said trip to inoperative position.

7. A starting coupling for igniter magnetos comprising relatively movable driving and driven disks having hub portions, a projecting lug on the hub of said driving disk, a coöperating stop on the hub of said driven disk, a spring coiled about said hub portions and connected at its ends to said disks, the latter having flanges inclosing said spring, a spring-held locking dog on said driven disk and engaging said lug to normally hold the same in engagement with said stop, said dog having a tail portion projecting outwardly through a slot in the flange of said driven disk, a shiftable trip on a stationary part arranged to engage the tail of said dog to release the same and hold said driven disk against movement, and a projecting cam on the flange of said driving disk for shifting said trip to inoperative position.

8. In a starting coupling for igniter magnetos, the combination with a magneto shaft and a stationary part of co-axial, relatively rotatable driving and driven members for rotating said shaft, means positively connecting said members against relative rotation, an actuating spring interposed between said members for imparting an accelerated rotary movement to said driven member, and a trip device mounted on said stationary part and arranged to successively engage and release said connecting means and arrest said driven member to thereby place said spring under tension, and means on said driving member for automatically shifting said trip to thereby release said driven member and permit the accelerated rotation thereof by said actuating spring.

FREDERICK H. HORNING.

Witnesses:
J. G. ANDERSON,
A. R. CROSMAN.